United States Patent [19]

Crane et al.

[11] Patent Number: 4,573,196
[45] Date of Patent: Feb. 25, 1986

[54] CONFUSION GROUPING OF STROKES IN PATTERN RECOGNITION METHOD AND SYSTEM

[75] Inventors: Hewitt D. Crane, Portola Valley; John S. Ostrem, Palo Alto, both of Calif.

[73] Assignee: Communications Intelligence Corporation, Menlo Park, Calif.

[21] Appl. No.: 459,180

[22] Filed: Jan. 19, 1983

[51] Int. Cl.$^4$ .............................................. G06K 9/62
[52] U.S. Cl. ...................................... 382/13; 382/30; 382/37
[58] Field of Search .................... 382/13, 3, 36, 37, 30, 382/40, 18, 1, 24, 56; 381/42

[56] References Cited

U.S. PATENT DOCUMENTS

| | | | |
|---|---|---|---|
| 3,165,718 | 1/1965 | Fleisher | 382/18 |
| 3,618,016 | 11/1971 | Steenis | 382/30 |
| 3,700,815 | 10/1972 | Doddington et al. | 381/42 |
| 3,995,254 | 11/1976 | Rosenbaum | 382/40 |
| 4,027,284 | 5/1977 | Hoshino et al. | 382/30 |
| 4,035,768 | 7/1977 | Boldridge, Jr. et al. | 382/3 |
| 4,040,010 | 8/1977 | Crane et al. | 382/30 |
| 4,173,753 | 11/1979 | Chou | 382/1 |
| 4,284,975 | 8/1981 | Odaka | 382/13 |
| 4,365,235 | 12/1982 | Greanias et al. | 382/13 |

FOREIGN PATENT DOCUMENTS 52-083733 7/1977 Japan .
978824 11/1979 Japan .

OTHER PUBLICATIONS

K. Ikeda et al., "On-Line Recognition of Hand-Written Characters Utilizing Positional and Stroke Vector Sequences", 1981, *Pattern Recognition*, vol. 13, No. 3, pp. 191-206.

E. F. Yhap et al., "An On Line Chinese Character Recognition System", May 1981, IBM J. Res. Develop., vol. 25, No. 3, p. 187.

Crane et al., "A Technique for the Input of Handprinted Chinese Characters Based on Sequential Stroke Recognition", Dec. 27-29, 1977, Proceedings of International Computer Symposium 1977, vol. One, pp. 246-261.

Ching Y. Suen et al., "Automatic Recognition of Handprinted Characters-The State of the Art", Apr. 1980, Proceedings of the IEEE, vol. 68, No. 4, pp. 469-487.

*Primary Examiner*—Leo H. Boudreau
*Attorney, Agent, or Firm*—Townsend & Townsend

[57] ABSTRACT

A method and system for recognizing complex patterns, such as Chinese characters (Kanji), which may employ detailed information about an element and specifically curvature characteristics. Selected elements or strokes are grouped into confusion groups. Strokes under examination are categorized and assigned either stroke identity labels or confusion group identity labels by a flexible comparison of distance metrics generated with reference to templates which represent general recognition criteria or groupings of specific strokes. Specific threshold criteria are applied to distance metrics.

17 Claims, 4 Drawing Figures

WRITTEN CHARACTER PROCESSING SYSTEM

| STROKE | CONFUSION GROUP LABEL | STROKE CODE |
|---|---|---|
| ` | 1 | A |
| — | 2 | B |
| \| | 3 | C |
| / | 3 | D |
| \ | 1 | E |
| / |  | F |
| ↓ | 3 | G |
| ⏋ | 4 | H |
| 乙 |  | I |
| ∠ | 5 | J |
| ㇉ |  | K |
| ㇌ |  | L |
| ㇋ | 6 | M |
| ㇋ | 6 | N |
| ⏋ | 4 | O |
| ⌡ | 3 | P |
| ·L | 5 | Q |
| ⏋ | 2 | R |
| ㇆ | 4 | S |
| ⌊ | 5 | T |
| \ | 1 | U |
| ∠ | 5 | V |
| ⌣ | 2 | W |
| ∨ | 3 | X |
| ㇌ |  | Y |

CONFUSION GROUPING OF STROKES IN PATTERN RECOGNITION METHOD AND SYSTEM

BACKGROUND OF INVENTION

1. Reference to Related Applications

Filed concurrently with this application are applications entitled "Complex Pattern Recognition Method and System", Ser. No. 459,282, and "Method for Distinguishing Between Complex Character Sets", Ser. No. 459,283, now U.S. Pat. No. 4,531,231.

2. Field of Invention

This invention relates to pattern recognition, for example, to recognition of handwritten characters such as Chinese characters (i.e., Kanji). Specifically, this application relates to identification of complex characters composed of elements, namely strokes, wherein strokes of distinguishable significance are subject to confusion.

The recognition of complex characters has been pursued with limited success for many years. Kanji has been considered the greatest challenge because it is not easily adapted to keyboard input. There are for example approximately 10,000 distinguishable characters in use in the Kanji system representing various words, phrases, concepts and in some instances syllables.

Various recognition schemes have been reported for hand registered characters. The schemes are typically based on spatial and certain limited shape characteristics of elements such as strokes, a stroke being the locus and sequence of a continuous chain of related points created by substantially uninterrupted contact between a pattern-forming means and a pattern-accommodating means, such as a pen and a tablet or any other movement-registering instrument or system. Prior art schemes are aimed at collecting and retaining a substantial amount of information which is processed in an attempt to distinguish the character from all other characters.

Recognition of complex characters of the type of interest is made more difficult because there are no uniform definitions for the fundamental stroke types from which the characters are formed, and there is substantial variation in character formation, even by the same writer. Consequently there is a potential for confusion between differing strokes and between different characters. What is needed is a pattern recognition scheme which is capable of tolerating wide variations while accurately identifying patterns and specifically characters from groups of basic elements such as strokes.

3. Description of the Prior Art

Prior stroke recognition systems relevant to the present invention are represented by the following references:

"On-Line Recognition of Handwritten Characters", Hiroki Arakawa et al., *Review of the Electrical Communication Laboratories,* Vol. 26, Nos. 11-12, Nov.-Dec. 1978 describes a system in which a pair of linear waveforms is derived by recording in rectangular coordinates the movement of a handwritten point, approximating linear waveforms through a rectangular function expansion and then recognizing a character by utilizing a set of coefficients of the rectangular function.

*IEEE Transactions on Electronic Computers,* Dec. 1967, pp. 856860; Japanese Patent Application No. 1977-083733 entitled "On Line Recognition Method of Handwritten Characters" filed July 12, 1977; and U.S. Pat. No. 4,173,753 to Chou entitled "Input System for Sino-Computer" represent another general type of stroke recognition technique, namely, pattern matching. In Chou, strokes are recognized as elementary patterns in strings of elementary strokes. In the '733 reference, a spatial matching technique is described. Strokes of a character to be recognized are approximated by coordinate position, and deviations from standard coordinate patterns are computed point by point and summed over the whole character to obtain decision criteria. Analysis of these types of schemes supports a conclusion that increasing the amount of information about a stroke does not necessarily lead to improved recognition accuracy. In fact, increasing the precision of stroke registration increases the difficulty of pattern matching. On the other hand, decreasing the precision of stroke registration causes confusion among strokes of similar shape but differing significance. In either extreme, stroke recognition accuracy degrades.

"On-Line Recognition of Hand-Written Characters Utilizing Positional and Stroke Vector Sequences", *Pattern Recognition,* Vol. 13, No. 3, p. 191 (Permagon Press, 1981) is a reference which reports of an extended six company/university joint effort to develop a stroke vector sequence character recognition system based on elemental stroke shapes derived from five percent to ten percent of a stroke length. A great deal of data is developed about a relatively small portion of a stroke. The proposed system is believed to be expensive and insufficiently accurate to be a practical and commercial success.

E. F. Yhap et al., "An On Line Chinese Character Recognition System", *IBM Journal of Research and Development,* Vol. 25, No. 3, p. 187 (May 1981) describes a handwritten Chinese character recognition scheme in which a large number of parameters about a Chinese character are categorized, generally in relation to positions within a field of registration.

Crane et al., "A Technique for the Input of Handprinted Chinese Characters Based on Sequential Stroke Recognition", *Proceedings of International Computer Symposium* 1977, Vol. One, p. 246 (27-29 Dec. 1977, Taipei, Republic of China) is a survey article. It further describes a proposed character recognition technique suitable for essentially real time processing. It is based on stroke label sequence recognition where there is limited-precision stroke recognition. The paper is an early publication related to the present work and describes preliminary conclusions of the present inventors. The present invention may be used in connection with techniques described in this and other prior works.

Crane et al., U.S. Pat. No. 4,040,010 issued Aug. 2, 1977, describes a handwriting verification system in which a special pen produces signals representative of various parameters based on angularly resolved writing pressure for identifying a signature or other appropriate group of relatively simple characters or symbols. A signature is deemed to be a forgery according to the invention if the sum of the component variations of the detected signature deviates beyond some preselected threshold value established by a signature template.

Various other methods not to be confused with the present invention relate to the pictorial aspects, that is, spatial appearance, of a character. These and other schemes have been explored for many years, and substantial research efforts have been largely unsuccessful in providing a practical character recognition system which can be used in an interactive, essentially real-time environment.

SUMMARY OF THE INVENTION

According to the present invention, a character recognition scheme employs identification of a handwritten stroke by grouping elements or stroke types into confusion groups based on criteria such as general complexity, radial direction, other stroke-shape related criteria or related meaning. A stroke is assigned an identity label upon comparison with such criteria stored in the system. The criteria may take the form of a preselected set of predefined templates, the templates each comprising for example a set of related data points or positions along a template stroke. According to one aspect of the invention, distance metric values of a stroke under examination normally generated by comparison of the stroke under examination with templates or model strokes are excluded from the normal recognition process when the template strokes which would generate the second and greater distance metric values belong to the same confusion group as the template stroke producing the least distance metric value. A stroke categorized as a member of a confusion group is employed in connection with other strokes identified by stroke labels to specify the intended character.

In a related application entitled "Complex Pattern Recognition Method and System" a process is disclosed whereby strokes are matched with templates and assigned identity labels. As used herein a stroke refers to an individual element, namely the locus and sequence of a continuous chain of related points.

According to an alternative aspect of the invention, a stroke found to match a template of a particular confusion group is identified for character recognition purposes by a confusion group label. Character identification is made by comparing identified stroke labels and/or confusion group labels against a dictionary made up of stroke labels and/or confusion group labels generally arranged in sequence of occurrence in writing.

According to a still further alternative of the invention, a confusion group template may be a locus of all points and all criteria for at least two elements of distinguishable significance. A confusion group label is assigned if all of the criteria developed for the element under examination are included within the confusion group template.

According to a still further alternative of the invention, a confusion group may be defined as the locus of all criteria for one element or the locus of all criteria for another element. A confusion group label is assigned to an element under examination which satisfies one such set of criteria.

The stroke confusion grouping according to the invention permits the deliberate discarding of information early in the recognition process allowing flexible yet potentially accurate identification of stroke types. The grouping of stroke types of distinguishable significance which are likely to be confused avoids attempts at unmeaningful precision when recognition criteria are applied.

In addition, the invention permits substantial flexibility in the use and development of a character vocabulary in a system for recognition of complex characters such as Kanji. Strokes may be added and parameters of strokes may be changed to accommodate different types of complex characters, and selected stroke templates can be ignored during the recognition process.

The invention eliminates the accumulation of much unneeded information about stroke form and minimizes the amount of processing required to recognize a stroke resulting in accurate stroke and character recognition at reasonable cost. The invention has numerous applications. It may be used in an interactive word processing and data entry system. Other purposes include use as a teaching tool to train individuals in stroke writing and preferred stroke sequence and as a lexicon aid for looking up meanings of characters as well as pattern recognition applications in general.

As used herein, a confusion group generally has reference to a grouping of elements which have distinguishable significance yet which are subject to confusion due to similarity in shape. A confusion group may in some instances be indistinguishable from an individual stroke in treatment and use, representing for example a hybrid or average of strokes. The term may also mean to include a grouping of strokes found desirable not to identify separately.

The invention is explained with reference to a specific embodiment in which curvature characteristics of a stroke are registered in the form of a set of vectors and specifically the polar coordinate representation of vectors at the position of each selected sample point along the stroke. The invention, however, is not limited to the specific recognition system described herein employing point for point matching. Moreover, the invention can be used in connection with other pattern recognition techniques. The invention will be better understood by reference to the following detailed description taken in connection with the accompanying drawings.

DESCRIPTION OF SPECIFIC EMBODIMENTS

As used herein, a pattern is any two-dimensional shape or sequence of movement, such as a character. A template is any set of criteria about a pattern element. Specifically, a template may be a set of data points and criteria about data points, the locus of which define the shape of an element of a pattern, such as a stroke. An element is any discrete characteristic of a pattern. A stroke is a specific type of element. Strokes of different shapes are recognizable as having distinguishable significance. A character is any combination of strokes or elements, such as a pattern used in a writing system.

Figure 1:
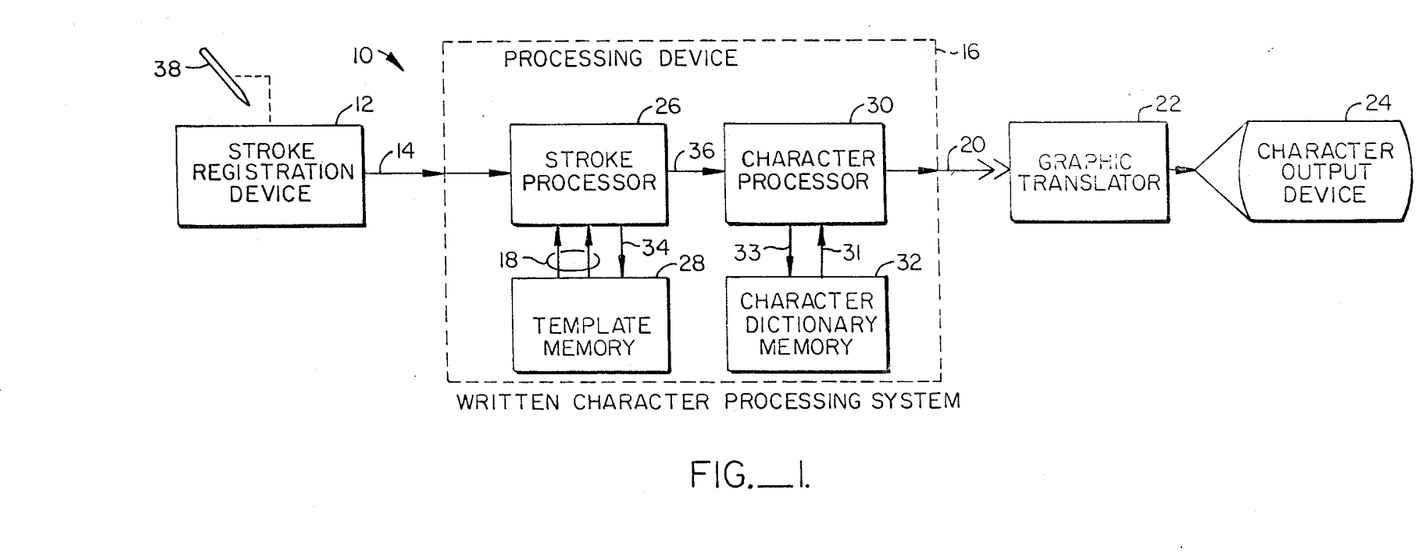
FIG. 1 is a block diagram of a written character processing system according to the invention.

Referring to FIG. 1, there is shown a handwritten pattern identification system 10 which is used as a character recognition device. It includes a stroke registration means 12 which generates first signals representing first signal information describing written strokes as hereinafter explained, the first signals being supplied by a first signal line 14 to a data processing means 16. The processing means is operative to compare second signals representing second signal information describing template strokes to yield signals on signal line 20 identifying the character or specific portion of the written character under examination. An output signal line 20 of the data processing means 16 is connected to a graphic translator 22 which in turn drives a character output device 24 such as a visual display, a printer or other character processing device.

It has been discovered that too much information about a character or stroke can be as detrimental to identification as too little information. Yet it has also been discovered that at least initially substantial care must be taken to adequately register the information even if the entire amount of information is not used in the recognition process. It is an object of the invention to identify the element and pattern as early as possible and to discard as much information as possible to both increase accuracy and to avoid storage and processing of unneeded to redundant information.

There are many possible embodiments of the invention. The following description sets forth but a few representative embodiments.

The data processing means 16 includes means for comparing the first signal information, the input signals, with the second signal information, the stored signal, to obtain an identification of the stroke under examination, the third signal information, as hereinafter explained. In the specific embodiment, only curvature characteristics of the stroke under examination are specified, and generally to a relatively high degree of precision, for use in identifying and labeling the stroke under examination. Other criteria, such as character complexity or stroke complexity may likewise be employed. The second signal information describing the model strokes takes the form of stroke templates. A stroke template is generally an ordered set of values at second data points generally corresponding to sampled or interpolated positions of the first data points of the stroke under examination. The values of the second data points may define relative position and permissible deviation values at each second data point. A confusion group template may substitute for several stroke templates.

The processing means 16 may include a stroke processor 26, a template memory 28 (capable of storing stroke and confusion group templates), a character processor 30 and a character dictionary memory 32. The template memory 28 is responsive to a signal on a template address select line 34 to provide second signals on a second signal line 18 to the stroke processor 26. The stroke processor 26 identifies the stroke represented by the first signal information based on the second signal information. The first signal information applied to the stroke processor 26 may include stroke positional information which is generally normalized relative to the starting point of each stroke, since stroke position relative to other strokes plays no part in the initial stroke recognition process of a preferred embodiment. A label signal is provided at the output of the stroke processor 26 on a label line 36 to the character processor 30.

The character dictionary 32 is responsive to a signal on character address select line 33 to provide signals on a character label line 31 to the character processor 30. The character processor 30 is operative to identify one or more characters represented by a collection of stroke and/or confusion group label signals. Once the total set of unknown input signals generated from writing an entire character is recognized as possibly one or more characters, a character label signal is provided at the output of the character processor 30 on signal line 20, where the graphic translator 22 recognizes the character or characters and the output device displays or permits the characters to be displayed. If two or more characters are to be displayed, the stroke registration device 12 may then be used by an operator to select or otherwise indicate which of the displayed characters is the intended character. In the event of ambiguous identification or upon default, the intended character is then registered or otherwise used in a data processing sequence.

Figure 2:
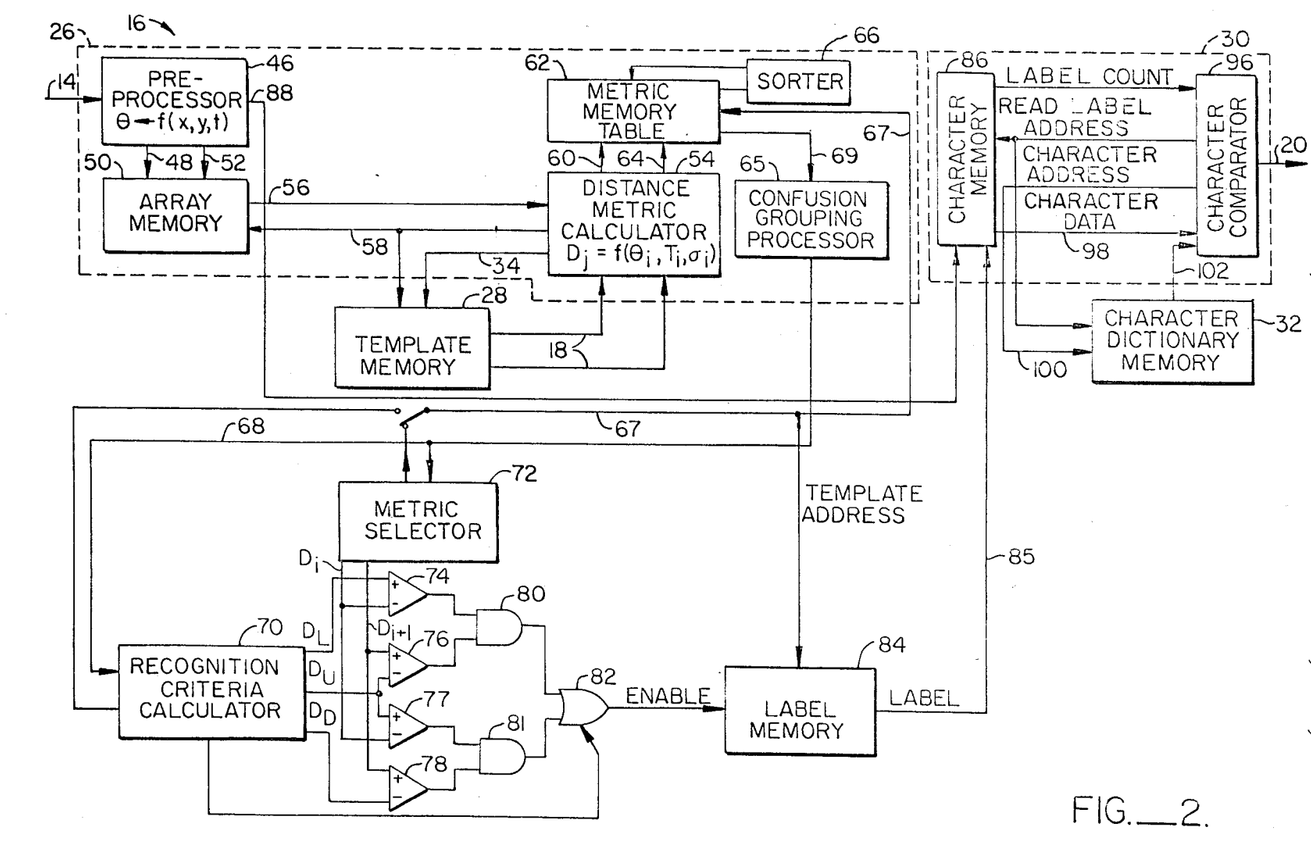
FIG. 2 is a block diagram of a processing device operative in accordance with the invention.

Turning to FIG. 2, there is shown a portion of one data processing means 16 according to the invention. The apparatus is operative as follows:

Raw data which may be in the form of a stream of x-y coordinate pairs generated as a function of time are transformed by a preprocessor 46 into a standard number of x-y coordinate pairs, for example thirty in accordance with a particular prototypical embodiment, spaced evenly along the length of a stroke under examination. The precise values of the x and y coordinates are interpolated from the raw data as if the strokes were drawn at a constant rate. The interpolated x-y coordinate pairs are initially converted to a plurality of discrete, straight-line, standard-length vectors with specific angle values in polar coordinates specifying stroke curvature characteristics along the contour of the stroke under examination. The angle value is expressed as the arctangent of the chord between two data points in a reference plane. Alternatively the value at one data point could be the change in angle relative to the previous data point. The output of the preprocessor 46 is provided via data line 48 to an array memory 50. The data line 48 is a bus which carries the position value signals. A write address line 52 may be coupled from the preprocessor 46 to the array memory 50 to provide the stroke position address of the corresponding stroke position data. The array memory 50 generally has capacity to store at least all the contour information of an entire character. Each character is normally stored in stroke sequence. The array memory 50 in a particular embodiment may therefore be a simple shift register which is operative on a first-in, first-out basis, thus eliminating a need for an explicit write address line. The data output of the array memory 50, in the form of the position value signals values, is provided to a distance metric calculator 54 via data line 56. The distance metric calculator 54 may generate read address information through a read address line 58 to the array memory 50. (A distance metric is a mathematical value which represents a separation value between any two contours.) The purpose of the distance metric calculator 54 is to compute the closeness of the curvature characteristics of the stroke under examination to each one of a set of stroke templates. The stroke templates according to a specific embodiment of the invention are stored in a stroke template memory 28 in the form of a two column array of angular position values $T_i$ and corresponding permissible angular deviation values $\sigma_i$.

Confusion group templates may take the form of stroke templates as stored. Confusion group templates may be superpositioned combinations of stroke templates or groups of distinguishable stroke templates each assigned a common label. Confusion group templates formed of a group of superpositioned stroke templates may retain the deviation values associated with each point, or new deviation values may be assigned to account for the locus of points generally falling between superpositioned stroke templates.

Figure 3:
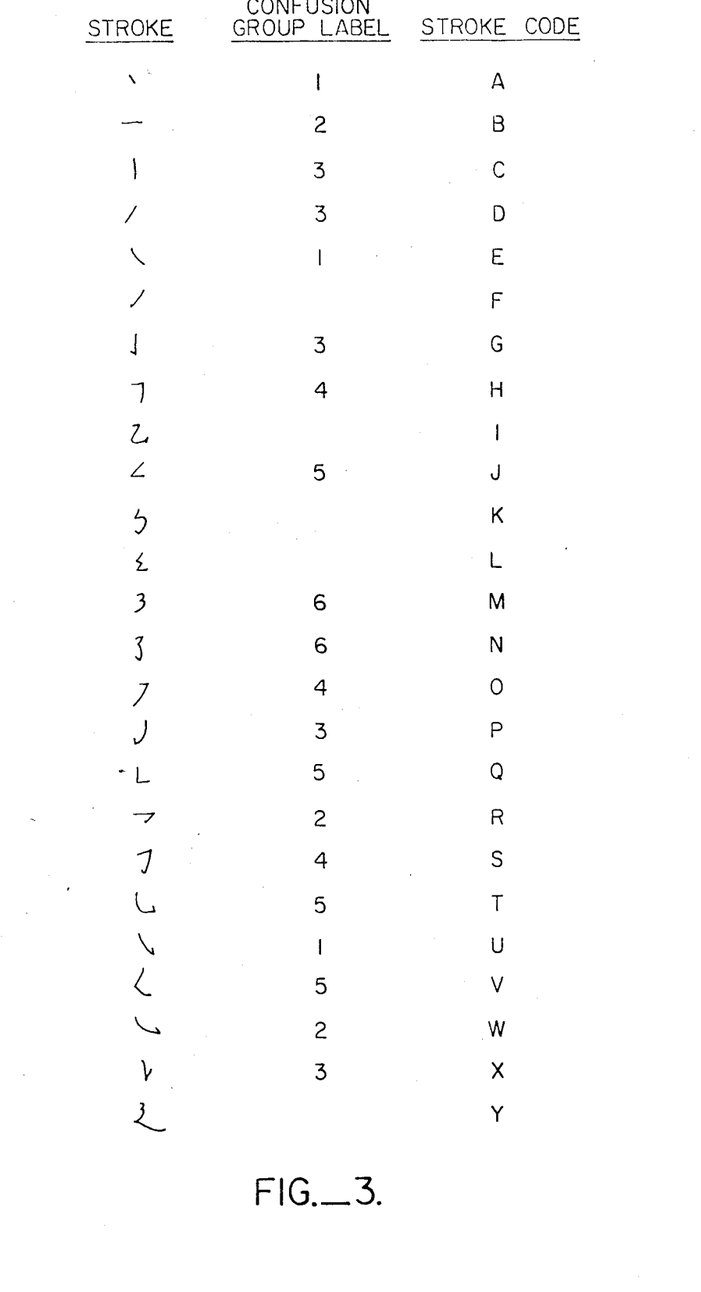
FIG. 3 is a table of strokes illustrating confusion grouping according to the invention.

The template data points, or second data points, are selected to correspond with the first data points, or data points of the stroke under examination, in both number and position. FIG. 3 gives a representative set of the template strokes empirically derived from the Kanji. The permissible angular deviation values for each stroke are a set of up to thirty positive values which may differ from point to point and from stroke to stroke. The values are based on experimentation and so are not given here. A stroke code has been arbitrarily assigned to each one of the template strokes except as hereinafter explained. The stroke code may be an ASCII character or the like which is suitable for data storage.

The distance metric for each template is calculated in one of various ways. In a first alternative, the difference in angular displacement between the stroke under examination and the template is calculated by subtracting the angular value of each first data point from the angular value of the corresponding second data point to obtain an absolute value. The resultant difference value is then divided by the corresponding permissible angular deviation value to obtain a positive resultant value at each data point, and all of the positive resultant values are summed. In a second alternative, the resultant values are each squared and the new resultant values are summed. In the latter case, the minimum distance metric is analogous to a least squared difference representation of the separation between the first and second data points weighted by the permissible angular deviation value.

The distance metric calculator 54 (FIG. 2) draws the position value and the related deviation value for each second data point of each template from the stroke template memory 28 through second signal lines 18, one line being for the position value and the other line being for the deviation value. A single metric value for each template is provided through a metric data line 60 to a metric memory table 62. The metric data is sorted in the metric memory table 62 in order from least to greatest. A write address line 64 conveys the initial address signals from the distance metric calculator to the table 62. A sorter 66 coupled to the table 62 may be employed to rearrange the order of the data. In a first embodiment confusion group templates are treated precisely as if they were stroke templates. A confusion group template may replace several stroke templates. In such an embodiment it may be unnecessary to employ a confusion grouping processor 65 as hereinafter explained.

Where the confusion group consists of several strokes which retain some individual characteristics, the sorted metric data output of the table 62 may be coupled via a data line 69 to a confusion grouping processor 65. The confusion grouping processor 65 is operative in alternative ways, in addition to direct substitution for more than one stroke template, as above, depending on the particular embodiment. According to a second embodiment, the confusion grouping processor 65 flags or otherwise notes which stroke templates are members of the confusion group of the stroke template producing the least distance metric $D_i$ for the stroke under examination. Thereafter metrics corresponding to those stroke templates are ignored in the label selection process carried out by the metric selector circuitry. This technique permits a unique stroke identity label to an individual member of a confusion group notwithstanding the fact that the member of the confusion group does not satisfy all recognition criteria when compared with other members of the confusion group.

In a third embodiment, the confusion grouping processor 65 is operative to substitute a confusion group label for each template stroke which is a member of a confusion group. That is, the templates of all characters within a confusion group are treated as if they represented a single character, yet each of the recognition criteria applicable to a particular stroke type is retained for the purpose of metric calculation. In this alternative, the confusion group label is substituted for the stroke label in the character memory 86 as hereinafter explained. (The character dictionary may include a vocabulary containing characters defined in terms of combinations of character labels and confusion group labels, including alternates of combinations.)

The output of the metric memory table 62 in the first embodiment, or in the second or third embodiments, the output of the confusion group processor 65, is coupled to a recognition criteria calculator 70 and to a metric selector 72 through a data line 68. An address line 67 allows the metric selector 72 or the recognition criteria calculator 70 to access the metrics stored in the metric memory table 62.

In the recognition criteria calculator 70, confusion groups and separately defined strokes are treated the same in computing decision threshold values as hereinafter explained. The recognition criteria calculator 70 compares the least distance metric $D_i$ and at least the next least distance metric $D_{i+1}$ of the template not belonging to the same confusion group as the template corresponding to the least distance metric $D_i$ against three specific threshold criteria. The threshold criteria are an upper decision threshold $D_U$, a lower decision threshold $D_L$, and a difference decision threshold $D_D$. The upper decision threshold $D_U$ and the lower decision threshold $D_L$ as well as the difference decision threshold $D_D$ are assigned values based on preselected tolerance levels. The lower decision threshold $D_L$ is the size of the largest acceptable distance metric between the template most closely matching the stroke under examination. The upper decision threshold $D_U$ is the smallest permissible distance metric for the template with the next least distance metric $D_{i+1}$. The difference decision threshold $D_D$ is the sum of the least distance metric $D_i$ and a separation $D_d$. These three decision criteria are compared with the least distance metric $D_i$ and next least distance metric $D_{i+1}$, taking into account confusion grouping, in the first comparator 74, second comparator 76, third comparator 77 and fourth comparator 78. First comparator 74 produces a positive indication if the least distance metric $D_i$ is less than the lower decision threshold $D_L$. The second comparator 76 produces a positive logic indication if the next least distance metric $D_{i+1}$ (not of the same confusion group) is greater than the upper decision threshold $D_U$. The outputs of the first comparator 74 and second comparator 76 are provided to an AND gate 80 so that the respective positive logic indications jointly indicate stroke recognition.

The third comparator 77 produces a positive logic indication if the value of the least distance metric $D_i$ is less than the upper decision threshold $D_U$. The fourth comparator 78 produces a positive logic indication if the value of the next least distance metric $D_{i+1}$ is greater than the difference decision threshold $D_D$, where $D_D = D_i + D_d$. The output of the third comparator 77 is provided together with the output of the fourth comparator 78 to an AND gate 81 so that the joint positive logic conditions indicate stroke recognition. The outputs of AND gates 80 and 81 are coupled to an OR gate 82. If either of the input criteria is positively satisfied, then the system 26 indicates it has recognized the stroke under examination. A stroke label memory is activated by a TRUE output signal from OR gate 82. In response, the stroke label (or confusion group label) of the template corresponding to the least distance metric $D_i$ meeting the recognition criteria is loaded via line 85 into a character memory 86 at the current stroke address, as indicated by write stroke address line 88.

The character processor 30 includes the character memory 86 and a character comparator 96 to which the character dictionary memory 32 is coupled. Character data via a character data line 98 is communicated from the character memory 86 to the character comparator 96 in response to the presentation of a read stroke address command to the character memory 86. The character comparator 96 iterates through the character dictionary memory 32 by presenting a character address to a character dictionary memory 32 through a character address line 100. Labels of corresponding strokes, or strokes and confusion groups, of the addressed character and the character under examination are presented to the character comparator 96 through a character dictionary line 102 in response to the character address and the read stroke address command. The character comparator 96 is operative to compare the labels from the character memory with the labels from the dictionary memory 32 to provide as its output a signal in the form of a character label whenever a character is recognized.

A particularly powerful tool of one inventive embodiment is the distance metric calculator 54 and the stroke template set wherein the stroke template set comprises both polar position information and permissible angular deviation information. This form of template eliminates the need for additional templates to take into account stroke variations which do not precisely satisfy the template criteria. In connection with this tool, confusion group templates and/or the confusion grouping processor 65 are also provided which groups template strokes of distinguishable significance in various ways in confusion groups for recognition purposes. The least distance metric may correspond to the actual stroke written, yet the distinction between the actual stroke written and other strokes in the same confusion group may be insufficient to distinguish between other strokes in the same confusion group when identified by the distance metric technique according to the invention.

Referring to FIG. 3, there is shown a specific example of one confusion grouping scheme for Kanji. An unknown stroke may be recognized as being a member of a first confusion group consisting of strokes labeled A, E and U. When compared, the distance metrics between strokes labeled A, E and U are insufficiently distinguishable on the basis of all of the decision criteria. Under those circumstances, the least distance metric is presumed to have the stroke label "A" corresponding to the unknown stroke even though all of the decision criteria are not met for strokes E and U. Alternatively, the least distance metric is assigned the confusion group label "1". Alternatively, a separate confusion group template is provided which is the locus of all template strokes A, E and U and all points in between and which has the label "1".

FIG. 3 identifies six confusion groups by label from a catalog of twenty-five distinguishable strokes. Each confusion group consists of two to five strokes. Five strokes belong to no confusion group.

The character comparator 96 might recognize a string of confusion group and stroke identity labels as representative of more than one character. In such an event and in accordance with one embodiment, more than one character may be presented in display, and the user may select from among the presented characters the particular character which was intended to be registered. The number of characters that presented in this manner due to stroke ambiguity is relatively small, permitting the user to rapidly identify and specify the character ultimately intended.

Figure 4:
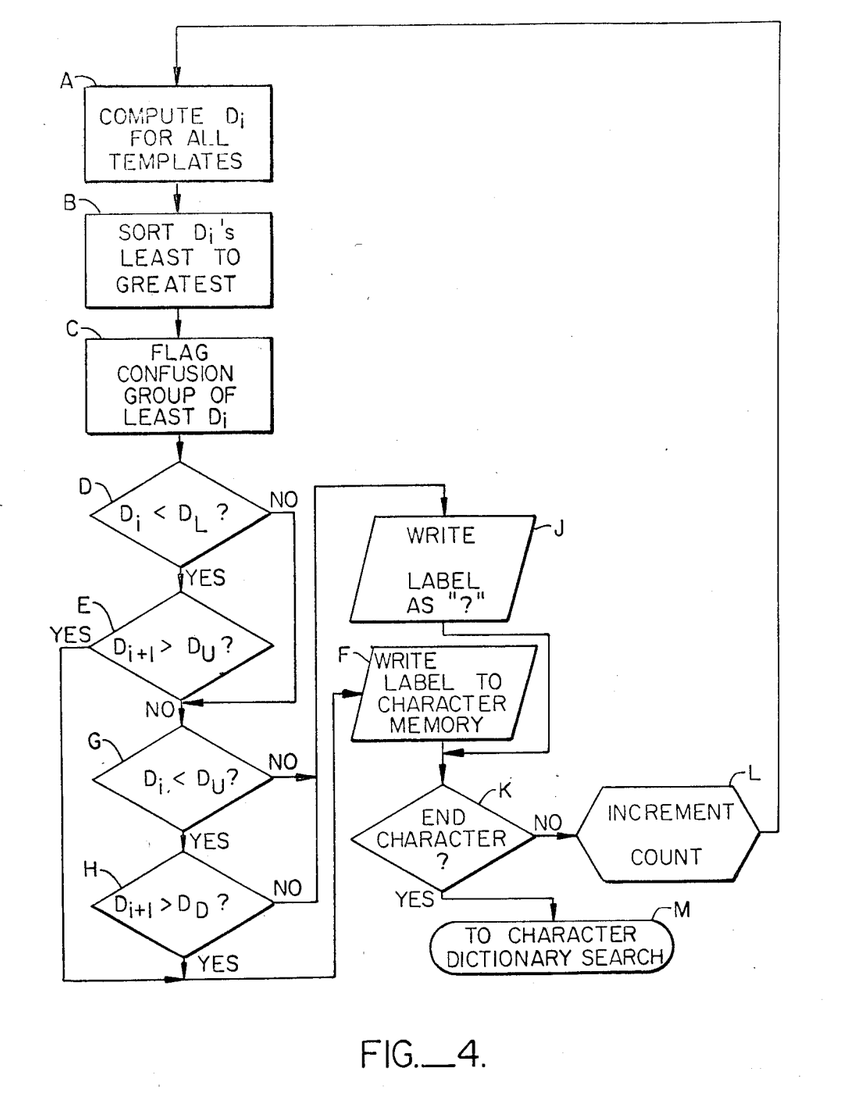
FIG. 4 is a flow chart of a method according to the invention.

Referring now to FIG. 4, there is a flow chart for a computer implementation of one embodiment of stroke recognition according to the invention. The distance metrics for all templates with respect to a particular stroke under examination are calculated (Step A). Thereafter, the distance metrics are sorted in order from least to greatest (Step B). The least distance metric corresponds to the most likely candidate for designating the label of the stroke under examination. However, stroke templates are flagged according to the confusion group of the least distance metric (Step C). Thereupon, recognition criteria are applied according to the invention to enhance the likelihood of accurate recognition. First, the least distance metric is compared with the lower decision threshold (Step D). If the indication is that the least distance metric $D_i$ is less than the lower decision threshold $D_L$, the next least distance metric $D_{i+1}$ is compared with the upper decision threshold $D_U$ to see if the next least distance metric $D_{i+1}$ exceeds the upper decision threshold $D_U$ (Step E). If the indication is positive, then according to this embodiment the system writes the stroke label to the character memory indicating recognition of the stroke (Step F). If the indication of either of the previous threshold level tests is negative, an alternative decision process is applied. First, the least distance metric $D_i$ is compared with the upper decision threshold $D_U$ to see if the distance metric $D_i$ is lesser (Step G). If yes, then the next least distance metric $D_{i+1}$ is compared with the difference decision threshold $D_D$ to see if the decision threshold $D_D$ is exceeded (Step H). The difference decision threshold $D_D$ is the sum of the least distance metric $D_i$ and the preselected separation $D_d$. If the indication is positive, then the system indicates that it has recognized the stroke and writes the stroke label in the character memory (Step F). Should the decision threshold criteria not be met, a question mark is generated as the stroke label (Step J), and the system goes on to the next stroke. The process is repeated for each stroke (Steps K and L) until all strokes in a character are processed. Thereafter a character dictionary search (Step M) is conducted to identify the character.

In one of the alternative embodiments wherein a stroke is recognized and is a member of a confusion group, the step (F) writes the confusion group label to the stroke memory.

One of the advantages of the confusion group labeling technique is flexibility in vocabulary. Multiple stroke templates are available for analysis purposes. Superpositioned templates may be incorporated into a single template having the deviation values adjusted to cover all generalizations of strokes or any grouping of strokes.

There is substantial advantage to the use of confusion group identity labels as a substitute for stroke labels in the character dictionary. With fewer equivalent strokes, the number of data bits required to store each label can be minimized, allowing for smaller, more efficient memory.

The invention has now been explained with reference to specific embodiments. Other embodiments will be apparent to those of ordinary skill in the art. It is therefore not intended that this invention be limited except as indicated by the appended claims.

We claim:

1. A method for identifying patterns by means of a pattern registration means and a data processing means, wherein each pattern comprises at least one unknown stroke generated by relative movement between a pattern-forming means and a pattern-accommodating means of said pattern registration means, said pattern registration means being operative to generate first signal information represented by first signals, said first signal information being representative of stroke information about said unknown stroke, said data processing means being provided with prestored second signal information represented by second signals, said second signal information including templates corresponding to template strokes, said data processing means being operative to generate third signals representing third signal information in response to said first signals and said second signals, said third signal information comprising identity labels for use in developing coded information which identifies said patterns, said method comprising:

defining templates from said second signal information wherein at least one of said templates is a confusion group template, each said confusion group template being derived from information about at least two of said template strokes;

generating distance metric values representative of closeness of stroke shape between said first signal information and said second signal information for at least each one of said confusion group templates; and determining from said distance metric values which of said confusion group templates or which of said stroke templates yields the least of said distance metric values to obtain an identity label for said unknown stroke by ignoring decision criteria for distinguishing between selected template strokes whenever said selected template strokes are included in a common one of said confusion group templates.

2. The method according to claim 1, further including the steps of:

calculating metric distance between corresponding first signal information and second signal information to obtain a set of difference values;

dividing each one of said difference values by a corresponding permissible deviation value to obtain a set of resultant values; and summing all said resultant values to obtain said distance metric value.

3. The method according to claim 1, wherein each one of said difference values has a corresponding permissible deviation value, further comprising the steps of calculating metric distance between corresponding first signal information and second signal information to obtain a set of difference values;

weighting each one of said difference values by its corresponding permissible deviation value to obtain a set of resultant values;

squaring each one of said resultant values to obtain a set of squared values; and summing all said squared values to obtain said distance metric value.

4. The method according to claim 1 wherein said determining step also includes indicating a match of said unknown stroke with a confusion group template whenever said first signal information is included within a locus circumscribing all of said pattern information of said confusion group template.

5. The method according to claim 1 further including the step of assigning a stroke label as said identity label for said unknown stroke.

6. The method according to claim 1 further including the step of assigning a confusion group label as said identity label for said unknown stroke.

7. A method for identifying patterns by means of a pattern registration means and a data processing means, wherein each pattern comprises at least one unknown stroke generated by relative movement between a pattern-forming means and a pattern-accommodating means of said pattern registration means, said pattern registration means being operative to generate first signal information represented by first signals, said first signal information being representative of stroke information about said unknown stroke, said data processing means being provided with prestored second signal information represented by second signals, said second signal information including templates corresponding to template strokes, said data processing means being operative to generate third signals representing third signal information in response to said first signals and said second signals, said third signal information comprising identity labels for use in developing coded information which identifies said patterns, said method comprising:

defining templates from said second signal information wherein at least one of said templates is a confusion group template, each said confusion group template being derived from information about at least two of said template strokes;

generating distance metric values representative of closeness of stroke shape between said first signal information and said second signal information for at least each one of said confusion group templates;

comparing said distance metric values of said unknown stroke for at least each confusion group template with an upper decision threshold value, with a lower decision threshold value and with a difference decision threshold value; and assigning a unique identity label corresponding to the template yielding the least distance metric value to the unknown stroke if the least distance metric value is less than the upper decision threshold value and if the next least distance metric value is greater than the sum of the least distance metric value and the difference decision threshold value.

8. The method according to claim 7, wherein said assigning step includes assigning an identity label to said unknown stroke if the distance metric value which is least is less than the lower decision threshold value and if the next least distance metric value is greater than the upper decision threshold value.

9. A method for identifying patterns by means of a pattern registration means and a data processing means, wherein each pattern comprises at least one unknown stroke generated by relative movement between a pattern-forming means and a pattern-accommodating means of said pattern registration means, said pattern registration means being operative to generate first signal information represented by first signals, said first signal information being representative of stroke information about said unknown stroke, said data processing means being provided with prestored second signal information represented by second signals, said second signal information including templates corresponding to template strokes, said data processing means being operative to generate third signals representing third signal information in response to said first signals and said second signals, said third signal information comprising identity labels for use in developing coded information which identifies said patterns, said method comprising:

defining templates from said second signal information, wherein at least one of said templates is a confusion group template consisting of at least two template strokes, each said template stroke comprising a set of position values specifying position along a stroke and a set of deviation values specifying permissible deviation from said position values; and comparing said first signal information for best match with said second signal information to obtain an identity label for said second signal information.

10. In an apparatus for identifying patterns by means of a pattern registration means and a data processing means, wherein each pattern comprises at least one unknown stroke generated by relative sequential movement between a pattern-forming means and a pattern-accommodating means of said pattern registration means, said pattern registration means being operative to generate first signal information represented by first signals, said first signal information being representative of stroke information about said unknown stroke, said data processing means being provided with prestored second signal information represented by second signals, said second signal information including templates corresponding to template strokes, said data processing means being operative to generate third signals representing third signal information in response to said first signals and said second signals, said third signal information comprising identity labels for use in developing coded information which identifies said patterns, the improvement comprising:

means for storing said second signal information defining templates wherein at least one of said templates is a confusion group template, each said confusion group template being derived from information about at least two of said template strokes;

means for generating distance metric values representative of closeness of stroke shape between said first signal information and said second signal information for at least each one of said confusion group templates; and means for determining from said distance metric values which of said confusion group templates or which of said stroke templates yields the least of said distance metric values to obtain an identity label for said unknown stroke by ignoring decision criteria for distinguishing between selected template strokes whenever said selected template strokes are included in a common one of said confusion group templates.

11. In the apparatus according to claim 10, the improvement wherein said determining means is operative to to yield as said identity label a specific stroke label for said unknown stroke.

12. In the apparatus of claim 10, the improvement wherein said determining means is operative to to yield as said identity label a confusion group label specifying a confusion group for said unknown stroke.

13. In the apparatus according to claim 12, further including means for comparing said distance metric values of said unknown stroke for each template with an upper decision threshold value, with a lower decision threshold value and with a difference decision threshold value of yield said identity label.

14. In the apparatus according to claim 13, further including means for assigning an identity label to said unknown stroke if the least distance metric value is less than the lower decision threshold value and if the next least distance metric value is greater than the upper decision threshold value.

15. In the apparatus according to claim 10, wherein said first signal information and said second signal information specify relative position along a stroke describing stroke shape, further including:

means for calculating metric distance between corresponding first signal information and second signal information to obtain a set of difference values;

means for dividing each one of said difference values by a permissible deviation value corresponding to each location of first signal information along a stroke to obtain a set of resultant values; and means for summing all said resultant values to obtain said distance metric value.

16. In the apparatus according to claim 10, wherein said first signal information and said second signal information specify relative position along a stroke describing stroke shape, further including:

means for calculating metric distance between corresponding first signal information and second signal information to obtain a set of difference values;

means for dividing each one of said difference values by a permissible deviation value corresponding to each location of first signal information along a stroke to obtain a set of resultant values;

means for squaring each one of said resultant values to obtain a set of squared values; and means for summing all of said set of squared values to obtain said distance metric value.

17. In an apparatus for identifying patterns by means of a pattern registration means and a data processing means, wherein each pattern comprises at least one unknown stroke generated by relative movement between a pattern-forming means and a pattern-accommodating means of said pattern registration means, said pattern registration means being operative to generate first signal information represented by first signals, said first signal information being representative of stroke information about said unknown stroke, said data processing means being provided with prestored second signal information represented by second signals, said second signal information including templates corresponding to template strokes, said data processing means being operative to generate third signals representing third signal information in response to said first signals and said second signals, said third signal information comprising identity labels for use in developing coded information which identifies said patterns, the improvement comprising:

means for storing said second signal information defining templates wherein at least one of said templates is a confusion group template, each said confusion group template being derived from information about at least two of said template strokes;

means for generating distance metric values representative of closeness of stroke shape between said first signal information and said second signal information for at least each one of said confusion group templates; and means for determining from said distance metric values which of said confusion group templates or which of said stroke templates yields the least of said distance metric values to obtain an identity label for said unknown stroke by ignoring decision criteria for distinguishing between selected template strokes whenever said selected template strokes are included in a common one of said confusion group template;

wherein said determining means includes:
(1) means for comparing said distance metric values of said unknown stroke for at least each confusion group template with an upper decision threshold value, with a lower decision threshold value and with a difference decision threshold value; and
(2) means for assigning a unique identity label to said unknown stroke, said identity label corresponding to the one of said templates yielding said distance metric value which is least if said least distance metric value is less than the upper decision threshold value and if the next least distance metric value is greater than the sum of the least distance metric value and the difference decision threshold value.

* * * * *